United States Patent
Vogt (10) Patent No.: US 12,448,788 B2
(45) Date of Patent: Oct. 21, 2025

(54) INSTALLATION OF FLOORCOVERING ARTICLE ON CHEMICALLY ABATED FLOORING SURFACE AND COMPOSITE ARTICLE

(71) Applicant: Milliken & Company, Spartanburg, SC (US)

(72) Inventor: Kirkland W. Vogt, Simpsonville, SC (US)

(73) Assignee: Milliken & Company, Spartanburg, SC (US)

( * ) Notice: Subject to any disclaimer, the term of this patent is extended or adjusted under 35 U.S.C. 154(b) by 36 days.

(21) Appl. No.: 17/504,736

(22) Filed: Oct. 19, 2021

(65) Prior Publication Data

US 2022/0034100 A1    Feb. 3, 2022

Related U.S. Application Data

(62) Division of application No. 16/353,146, filed on Mar. 14, 2019.
(Continued)

(51) Int. Cl.
*E04F 15/10*    (2006.01)
*A47G 27/02*    (2006.01)
(Continued)

(52) U.S. Cl.
CPC ............ *E04F 15/107* (2013.01); *A47G 27/02* (2013.01); *E04F 15/0215* (2013.01); *B32B 5/022* (2013.01);
(Continued)

(58) Field of Classification Search
CPC . B32B 5/022; B32B 2255/02; B32B 2255/10; B32B 2255/26;
(Continued)

(56) References Cited

U.S. PATENT DOCUMENTS

| 5,229,437 A | 7/1993 | Knight |
| 5,439,322 A | 8/1995 | Barnett |

(Continued)

FOREIGN PATENT DOCUMENTS

| CN | 103575848 A | * 2/2014 |
| JP | 2003020451 | 1/2003 |

(Continued)

OTHER PUBLICATIONS

Start Right Interior Latex Vapor Barrier Primer https://www.globalindustrial.com/p/start-right-interior-latex-vapor-barrier-primer-gallon-775836?infoParam.campaignId=T9F&srsltid=AfmBOopZR4ml3M42ZWAL1AkAwFQTvRN5UzFiRG474WLWQf3fkL2OWp3l10 (Year: 2024).*

(Continued)

*Primary Examiner* — Lynda Salvatore
(74) *Attorney, Agent, or Firm* — Brenda D. Amidon (57) ABSTRACT

The present invention relates to the installation of floorcovering articles on chemically abated flooring surfaces and the composite article resulting therefrom. More specifically, the invention relates to a process for chemical removal of mastic, putty and/or paste material from a flooring surface. The process includes applying abatement chemical to the mastic material on the flooring surface to soften the mastic material and cause it to physically separate and release from the flooring surface, removal of the mastic material and abatement chemical, and the subsequent application of a barrier coating to the flooring surface. The barrier coating reduces and/or eliminates the migration of residual abatement chemicals into floorcovering articles thereinafter installed on the chemically abated flooring surface. The resulting composite article is comprised of a chemically abated flooring surface containing pores, at least one abate- (Continued)

ment chemical in said pores, a polymer-containing barrier material, and a floorcovering article.

3 Claims, 9 Drawing Sheets

Related U.S. Application Data (60) Provisional application No. 62/656,387, filed on Apr. 12, 2018.

(51) Int. Cl.
| | |
|---|---|
| *B32B 5/02* | (2006.01) |
| *B32B 5/18* | (2006.01) |
| *B32B 5/24* | (2006.01) |
| *B32B 5/26* | (2006.01) |
| *B32B 7/12* | (2006.01) |
| *B32B 27/06* | (2006.01) |
| *B32B 27/08* | (2006.01) |
| *B32B 27/12* | (2006.01) |
| *B32B 27/30* | (2006.01) |
| *E04F 15/02* | (2006.01) |

(52) U.S. Cl.
CPC ............... *B32B 5/024* (2013.01); *B32B 5/028* (2013.01); *B32B 5/18* (2013.01); *B32B 5/245* (2013.01); *B32B 5/26* (2013.01); *B32B 7/12* (2013.01); *B32B 27/065* (2013.01); *B32B 27/08* (2013.01); *B32B 27/12* (2013.01); *B32B 27/30* (2013.01); *B32B 2255/02* (2013.01); *B32B 2255/10* (2013.01); *B32B 2255/26* (2013.01); *B32B 2262/0253* (2013.01); *B32B 2262/0276* (2013.01); *B32B 2262/101* (2013.01); *B32B 2262/14* (2013.01); *B32B 2266/0278* (2013.01); *B32B 2307/7265* (2013.01); *B32B 2419/04* (2013.01)

(58) Field of Classification Search
CPC .... B32B 2262/0246; B32B 2262/0253; B32B 2262/0261; B32B 2262/0269; B32B 2262/0276; B32B 2262/0284; B32B 2262/0292; B32B 2262/04; B32B 2262/062; B32B 2262/065; B32B 2262/08; B32B 2262/101; B32B 2262/12; B32B 2262/14; B32B 2266/0221; B32B 2266/0278; B32B 2266/06; B32B 2266/08; B32B 2307/718; B32B 2307/7265; B32B 2419/04; B32B 27/065; B32B 27/08; B32B 27/12; B32B 27/30; B32B 5/024; B32B 5/028; B32B 5/08; B32B 5/18; B32B 5/245; B32B 5/26; B32B 7/12; B32B 9/00; E04F 15/0215; E04F 15/107; C08K 5/01; C09D 133/00; C09D 133/04; C09D 163/00; C11D 7/44; C11D 7/5004; A47G 27/02; A47G 27/00; A47G 27/0437; A47G 27/0475

See application file for complete search history.

(56) References Cited

U.S. PATENT DOCUMENTS

| | | |
|---|---|---|
| 5,996,304 A | 12/1999 | Barker |
| 6,203,881 B1 | 3/2001 | Higgins |
| 6,468,623 B1 | 10/2002 | Higgins |
| 6,929,702 B1 | 8/2005 | Motsenbocker |
| 7,678,159 B1 | 3/2010 | Weiner |
| 7,846,214 B1 | 12/2010 | Weiner |
| 9,821,537 B2 | 11/2017 | Silvers |
| 2003/0089381 A1* | 5/2003 | Manning, Jr. ...... C11D 3/38627 134/1 |
| 2004/0013796 A1 | 1/2004 | Metzger |
| 2005/0123436 A1 | 6/2005 | Cumberland |
| 2006/0260655 A1 | 11/2006 | Martin |
| 2008/0188392 A1 | 8/2008 | Diamond |
| 2011/0190187 A1 | 8/2011 | Hawes, III |

FOREIGN PATENT DOCUMENTS

| | | |
|---|---|---|
| WO | 2008036109 | 3/2008 |
| WO | 2012065227 | 5/2012 |

OTHER PUBLICATIONS

Product description (Year: 2024).*
Patent Cooperation Treaty PCT International Search Report. Date of Mailing, Jul. 4, 2019, International Application No. PCT/US2019/022725. International Filing Date: Mar. 18, 2019.

* cited by examiner

INSTALLATION OF FLOORCOVERING ARTICLE ON CHEMICALLY ABATED FLOORING SURFACE AND COMPOSITE ARTICLE

CROSS REFERENCE TO RELATED APPLICATIONS

This application claims priority to and is a divisional of U.S. patent application Ser. No. 16/353,146, entitled "Installation of Floorcovering Article on Chemically Abated Flooring Surface and Composite Article" which was filed on Mar. 14, 2019, which claims priority to U.S. Provisional Patent Application No. 62/656,387, entitled "Installation of Floorcovering Article on Chemically Abated Flooring Surface and Composite Article" which was filed on Apr. 12, 2018, both of which are entirely incorporated by reference herein.

TECHNICAL FIELD

The present invention relates to the installation of floorcovering articles on chemically abated flooring surfaces and the composite article resulting therefrom. More specifically, the invention relates to a process for chemical removal of mastic, putty and/or paste material from a flooring surface. The process includes applying abatement chemical to the mastic material on the flooring surface to soften the mastic material and cause it to physically separate and release from the flooring surface, removal of the mastic material and abatement chemical, and the subsequent application of a barrier coating to the flooring surface. The barrier coating reduces and/or eliminates the migration of residual abatement chemicals into floorcovering articles thereinafter installed on the chemically abated flooring surface. The resulting composite article is comprised of a chemically abated flooring surface containing pores, at least one abatement chemical in said pores, a polymer-containing barrier material, and a floorcovering article.

BACKGROUND

Commercial and industrial buildings are generally known to have concrete flooring as the foundation of their structures. When installation of floorcovering articles is desired on this type of flooring surface, a variety of adhesive materials and/or mastic materials is used. Many of these materials are designed for permanent or semi-permanent adhesion of the floorcovering article to the flooring surface. A problem arises when it is time to replace the floorcovering articles because it is often difficult to remove the adhesive materials and/or mastic materials of the previous installation. Thus, removal chemicals have been developed and are used for abatement of these adhesive and/or mastic materials from flooring surfaces. By using the abatement chemicals, the physical scraping and mechanical force necessary to remove the old adhesives and mastics is greatly reduced. No concrete, asbestos, silica, or other dust is created. The original flat concrete surface can typically be restored. Without the abatement chemicals, mechanical grinding or bead blasting methods are necessary. When dry mechanical methods are used, large amounts of dust are put into the air creating potential health hazards, especially when asbestos or silica is present. Dry methods require appropriate air handling systems to prevent creating an airborne mess in the building. The dust will settle on the floor, on walls, and most problematically in the air handling system if special care is not exercised. Alternatively, wet mechanical methods can also be used. Unfortunately, these methods create a wet, concrete powder slurry that also can be problematic to contain and dispose of. Special care is needed to prevent the wet slurry from drying and creating the dust issue discussed above. The water can damage walls and adjacent floors if not contained. Since both grinding methods remove some of the concrete from the surface, they require additional restoration steps to produce a uniform, level surface after grinding is completed.

However, the use of these abatement chemicals is not without consequence. They are known to penetrate into the cracks and pores in concrete while softening and freeing the adhesives from the flooring surface. It is difficult to clean and remove the chemicals from the cracks and pores of the concrete during subsequent washing and removal steps of the abatement process. Later, after floorcovering articles have been applied to the chemically abated concrete, the chemicals are known to move (or migrate) into or onto other articles in close contact with the flooring surface. This movement/migration often leads to damage of the article.

Migration of chemicals from chemically treated flooring surfaces into floorcovering articles can cause detrimental damage to the floorcovering articles installed thereon. Invasion of chemicals, such as petroleum-based materials like hydrotreated light distillates (mineral spirits), alcohols, glycol ethers, methylene chloride, toluene, alkylbenzenes, and the like, or natural-based materials like alkyl esters of soybean oil, citrus oils, and the like, into the floorcovering article generally occurs through physical contact between the flooring surface and the contact surface of the article. Unwanted compositional and structural changes are possible. For example, issues with delamination of layers, loss of adhesion, and edge curling (loss of flatness) may occur. The result is reduced shelf-life and premature replacement of the floorcovering articles.

The present invention addresses these issues by providing a process that reduces the rate that the abatement chemical migrates from the treated flooring surface into the floorcovering article installed thereon by applying a barrier material to the flooring surface after chemical abatement of the adhesive and/or mastic material. The barrier material aids in reducing the migration of residual abatement chemicals from the flooring surface to the floorcovering articles. The process results in improved adhesion of the article to the flooring surface and improved stability (e.g. against delamination) of the article as well. Such improvements lead to extended product life (i.e. reduced need to replace the floorcovering articles), thereby providing a cost savings to the end-user of the process.

BRIEF SUMMARY

In one aspect, the invention relates to a composite article comprising: (a) a chemically abated flooring surface, wherein the flooring surface contains a plurality of pores, (b) at least one abatement chemical, wherein the at least one abatement chemical is present in at least a portion of the plurality of pores, (c) a polymer-containing barrier material, and (d) a floorcovering article.

In another aspect, the invention relates to a process for installing a floorcovering article on a chemically abated flooring surface comprising the steps of: (a) providing a chemically abated flooring surface; (b) applying a polymer-containing barrier material to at least a portion of the chemically abated flooring surface to form a chemically abated flooring surface containing a barrier coating thereon;

and (c) applying a floorcovering article to the barrier-containing, chemically abated flooring surface.

In a further aspect, the invention relates to a process for installing a floorcovering article on a chemically abated flooring surface comprising the steps of: (a) providing a flooring surface having a mastic material thereon; (b) applying at least one petroleum-based or natural-based abatement chemical to the mastic material on the flooring surface; (c) agitating the at least one abatement chemical into and/or onto the mastic material of the flooring surface to form a chemically treated pre-abatement flooring surface; (d) optionally, allowing the chemically treated pre-abatement flooring surface to rest/soak for a period of time; (e) removing at least a portion of the mastic material and the at least one abatement chemical from the flooring surface to form a chemically abated flooring surface; (f) applying a polymer-containing barrier material to at least a portion of the chemically abated flooring surface to form a chemically abated flooring surface containing a barrier coating thereon; (g) applying at least one adhesive material to the chemically abated flooring surface having the barrier coating thereon to form an adhesive-containing, chemically abated flooring surface; and (h) applying a floorcovering article to the adhesive-containing, chemically abated flooring surface.

In yet another aspect, the invention relates to a process for installing a floorcovering article on a chemically abated flooring surface comprising the steps of: (a) providing a flooring surface having a mastic material thereon; (b) applying at least one petroleum-based or natural-based abatement chemical to the mastic material on the flooring surface; (c) agitating the at least one abatement chemical into and/or onto the mastic material of the flooring surface to form a chemically treated pre-abatement flooring surface; (d) optionally, allowing the chemically treated pre-abatement flooring surface to rest/soak for a period of time; (e) removing at least a portion of the chemically treated pre-abatement flooring surface to form a chemically abated flooring surface; (f) applying a polymer-containing barrier material to at least a portion of the chemically abated flooring surface to form a chemically abated flooring surface containing a barrier coating thereon; and (g) applying a floorcovering article to the chemically abated flooring surface, wherein the floorcovering article contains at least one adhesive material, wherein the at least one adhesive material is in physical contact with the barrier coating of the chemically abated flooring surface.

DETAILED DESCRIPTION

The present invention relates to a process for the chemical abatement of flooring surfaces and the subsequent application of floorcovering articles to the chemically abated flooring surfaces.

Definitions

The term "floorcovering article," as used herein, is intended to describe a textile substrate which comprises face fibers and which is utilized to cover surfaces on which people are prone to walk. Thus, floorcovering articles include broadloom carpet; rugs; carpet tile; floor mats; indoor and outdoor rugs, tiles and floor mats; and the like. Carpet tile is also known as modular carpet.

The term "cement," as used herein, refers to a construction adhesive comprised of powdered calcined rock and clay materials that forms a paste when mixed with water and can be molded or poured to set as a solid mass.

The term "concrete," as used herein, refers to a building material made by mixing water with cement, gravel, and sand. It can be molded or poured to set as a solid mass. It is generally considered to be a porous material.

The term "mastic" and/or "mastic material," as used herein, refers to an adhesive material used generally as a bonding agent in commercial and industrial end-use applications and may be either naturally or synthetically derived. It is generally known to those skilled in the art as a quick and permanent binding agent which is often difficult to later remove.

The term "adhesive" as used herein, refers to any mechanical and/or chemical means used to create a lateral, frictional, and/or peel force between at least two opposing surfaces.

The term "abate," as used herein, refers to decreasing in amount, intensity and/or degree. Similarly, "abatement," as used herein, refers to a decrease in amount, intensity and/or degree.

The term "thermoplastic" is used herein in its conventional sense to mean a resin having the property of softening or fusing when heated and of hardening again when cooled. Thermoplastic materials suitable for use herein are selected from the group consisting of polyolefin polymers (such as polyethylene, linear low density polyethylene, polypropylene, polybutylene and copolymers made from ethylene, propylene and/or butylene), polyvinyl chloride (including high density polyvinyl chloride), polyvinylidene chloride, cellulosic resins (such as cellulose acetate, cellulose acetate butyrate and cellulose acetate propionate), acrylic resins (such as polymethyl methacrylate, styrene acrylonitrile, polystyrene, polycarbonate and acrylonitrile-butadiene-styrene), polyamides (such as nylon 6 and nylon 6,6), polyesters (such as polyethylene terephthalate, glycol modified polyethylene terephthalate and polybutylene terephthalate), and the like, and combinations thereof.

The present invention will now be described with reference to the Figures.

Figure 1:
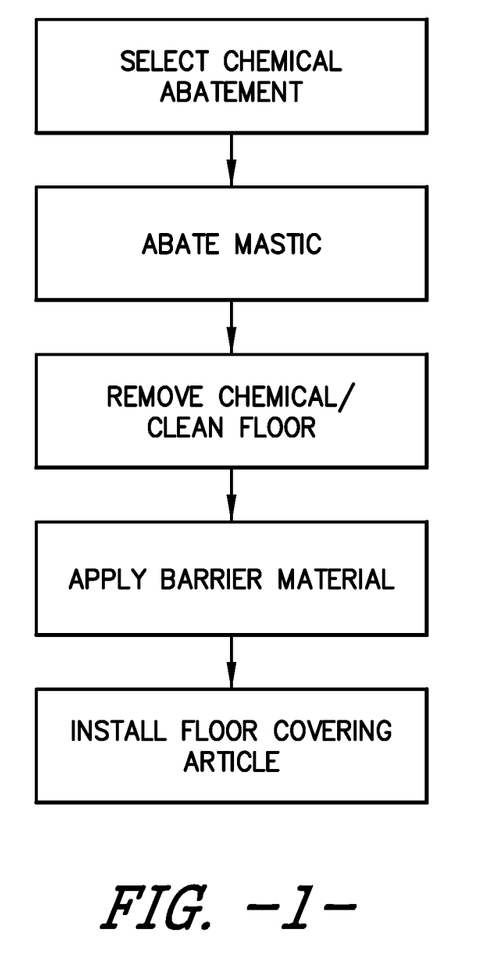
FIG. 1 is a flow diagram illustrating the general process of the invention.

FIG. 1 illustrates the general process of the invention in flowchart format. First, a decision is made about whether a particular flooring surface (such as a concrete flooring surface) contains mastic material that needs to be removed prior to further use. If this is indeed the case, then the mastic material is removed (abated) according to the steps described herein. Then, the loosened mastic material and abatement chemical(s) are removed and the chemically-abated flooring surface is cleaned. Next, a polymer-containing barrier material is applied. Finally, the floorcovering articles are applied and/or installed.

Figure 2:
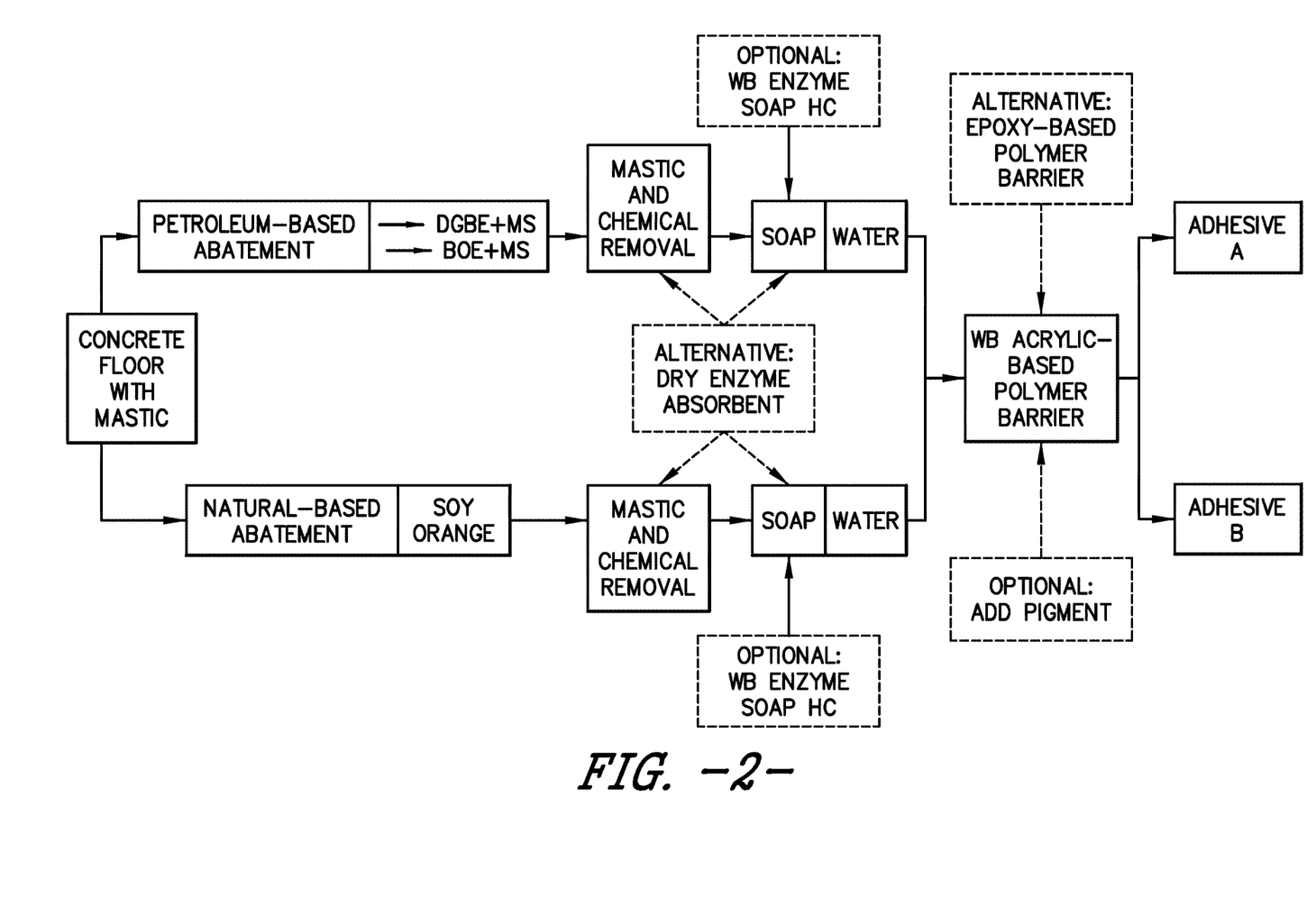
FIG. 2 is a flow diagram illustrating the process of the invention in greater detail.

FIG. 2 is a process flow chart illustrating the process of the invention in greater detail. As shown in FIG. 2, a concrete floor is provided having some amount of mastic and/or mastic material thereon. At least one abatement chemical is applied to the mastic-containing concrete floor. The abatement chemical is selected from the group consisting of petroleum-based abatement chemicals, natural-based abatement chemicals, and combinations or mixtures thereof.

Petroleum-based abatement chemicals generally include chemicals derived from materials containing a mixture of hydrocarbons such as alkanes (branched and/or linear hydrocarbons), aromatic hydrocarbons, cycloalkanes, and asphaltenes. Exemplary petroleum-based abatement chemicals are selected from the group consisting of diethylene glycol butyl ether (herein also "DGBE"), hydrotreated light petroleum distillates (mineral spirits, herein also "MS"), aminoethanol, 2-butoxyethanol (herein also "BOE"), 2-(2-butoxyethoxy)ethanol, methylene chloride (dichloromethane), methanol and other alcohols, toluene, monoethanolamine, 1,2-dimethyl-4-ethylbenzene, 1,2,3,5-tertramethylbenzene, 1,2,4,5-tetramethylbenzene, 1,3-dimethyl-4-ethylbenzene, 1,3-dimethyl-5-ethylbenzene, 1,4-dimethyl-2-ethylbenzene, 1-methyl-3-propylbenzene, naphthalene, 1,2,4-trimethylbenzene, 3-ethyltoluene, mesitylene, 2-ethyltoluene, 4-ethyltoluene, 1,2,3-trimethylbenzene, propylbenzene, o-xylene, ethoxylated nonylphenol, 2-(2-butoxyethoxy)ethanol, alcohol alkoxylates, benzenemethanol (benzyl alcohol), diethylene glycol monobutyl ether acetate and other glycol ethers, N-methyl-2-pyrrolidone, 2-(2-aminoethoxy) ethanol, and combinations thereof.

Natural-based abatement chemicals generally include chemicals derived from materials containing non-toxic ingredients that exhibit useful abatement and/or cleaning properties. Exemplary natural-based abatement chemicals are selected from the group consisting of soy-containing materials (herein also "Soy"), citrus-containing materials (such as orange), and combinations thereof. Soy-containing materials include soybean oils. Soybean oils include methyl ester of soybean oil. Citrus-containing materials include citrus oils (such as orange oil, lemon oil, and the like). Citrus oils include D-limonene.

The abatement chemical may be allowed to soak into and/or onto the flooring surface for a period of time. In one aspect of the invention, the abatement chemical is allowed to soak for a period of about 0.25 hours to about 4 hours, or from about 0.5 hours to about 3 hours, or even from about 1 hour to about 2 hours. During the soaking time, the surface may be mechanically agitated with a scraper to improve the penetration of the chemical into and under the mastic, allowing faster removal from the flooring surface.

As further shown in FIG. 2, after application of the at least one abatement chemical to the mastic-containing flooring surface, the loosened mastic is pushed into a pile or puddle and removed using dry absorbents, plastic shovels, and/or explosion-proof wet vacuums. Preferably, the dry absorbent material is used to aid in soaking up/absorbing the loosened and/or removable mastic material and abatement chemical(s) for ease of disposal. Examples of some dry absorbents include OIL DRI® Granular Clay Absorbent (Uline, Wisconsin), Floor Dry Granular Diatomaceous Earth Absorbent (West Coast Spill Supplies, Canada), K-SORB® Cellulosic Absorbents (Ecosorb International, Texas), Vermiculite Granular Absorbent (Uline, Wisconsin), Petroguard Granular Absorbent (Guardian Environmental Technologies, Connecticut) and Corn Cob Absorbents (The Andersons Cob Products, Ohio). In one aspect of the invention, the dry absorbent includes an enzyme that can aid the decomposition and further removal of the abatement chemical. An example is BacKrete® Waterless Concrete Cleaner (BacKrete Corporation, North Carolina).

After the mastic material has been removed from the concrete floor, the flooring surface is cleaned with soap (or detergent) and water. In one aspect of the invention, the soap includes an enzyme. In another aspect of the invention, the enzyme is a water-based enzyme. Exemplary enzyme-containing detergent products include CoverClean HC and CoverClean FG (CoverTec Products, Florida), and Serpro Tarmac and Asphalt Oil Stain Remover (Serpro, Kent, England). Example enzymes include lipases that catalyze the hydrolysis of organic chemicals, especially fats and oils. Some commercial enzyme manufacturers include Dupont Industrial Biosciences (US), Amano Enzyme (Japan), Novozymes (Denmark), AUM Enzymes (India), AB Enzymes (Germany), BASF (Germany), and VTR Bio-Tech (China).

While diligent efforts may be made to remove all of the mastic material and abatement chemicals from the flooring surface, it is generally known that concrete is a porous material. As such, residual abatement chemicals may remain on the surface of the floor and/or in the pores or cracks of the flooring surface. Such an arrangement allows for the possibility that these residual abatement chemicals will come into direct physical contact with (or close/near physical contact with) other materials, such as floorcovering articles. Without being bound by theory, it is believed that these residual chemicals migrate onto and/or into the floorcovering articles subsequently installed thereon. Measurements by gas chromatography, for example, can be used to evaluate the amount of chemical that has migrated. In one aspect of the invention, the chemically abated flooring surface is substantially free from mastic material.

In order to reduce and/or eliminate abatement chemical migration, a polymer-containing barrier material is applied to the chemically-abated flooring surface as illustrated in FIG. 2. The polymer-containing barrier material may be applied to the flooring surface using any of a variety of application techniques. Exemplary application techniques include, without limitation, paint coating, spray coating, roller coating, troweling methods, brush coating, and the like, and mixtures thereof.

It is believed that the barrier material provides a much-needed layer and/or coating for restricting and/or hindering the passage of any remaining chemical residue into the subsequently installed floorcovering article(s). Suitable polymer-containing barrier materials are selected from the group consisting of acrylic materials, epoxy-based materials, and mixtures and combinations thereof. Examples of suitable manufacturers of acrylic-based materials include Dow Chemical, Michigan (Roshield® and Rhoplex® Acrylic Emulsions); BASF, Germany (Joncryl® Acrylic Emulsions); Royal Adhesives, South Carolina (Hydra FAST-EN® brand); Lubrizol, Ohio (Carboset®, Hycar®, and Vycar® Emulsions); Star Seal, Ohio (SOS Sealer®); and Dalton Enterprises, Connecticut (Latex-Ite®). Epoxy-based materials include, for example, two-component epoxy-amines such as Epoxy Oil Stop Primer—For Oil Saturated Concrete (available from Epoxy Systems Inc. of Dunnellon, Fla.) and EM Oil Stop—Oil Saturated Concrete Floor Primer (available from Epoxy Master of Troy, Mich.). Epoxy-based materials also include, for example, solvent-based epoxy materials such as Oil Stop Primer (available from CoverTec of Sunrise, Fla.), SCI Oil Stop Primer 195-120 (available from Specialty Coatings Inc. of Fraser, Mich.), and Epoxy Oil Stop Coating HD 820 (available from Legacy Industrial of Winter Garden, Fla.). Other polymer-containing barrier materials may be utilized as well, either alone or in combination with those discussed herein, so long as they provide the desired barrier property of the present invention.

In one aspect of the invention, pigments may also be included in the polymer-containing barrier material, as shown in FIG. 2. The color pigments may be organic (such as pigment red 170, pigment yellow 17, and/or pigment blue 1), inorganic (such as iron oxide and/or titanium dioxide), and mixtures thereof. Extender pigments include materials such as kaolin, clay, silicates, silica, calcium carbonate, talc, zinc oxide, and mixtures thereof. Exemplary suppliers of pigments include Lansco Colors (New York), Dystar (Singapore), BASF (Germany), Chemours (Delaware), Imerys (France), Malvern Minerals Company (Arkansas), and Thiele Kaolin Company (Georgia). A preferred pigment is a kaolin-based material. Kaolin-based materials add color to the barrier material, while also improving the barrier properties of coatings. Commercially available examples of kaolin-based materials are the Hydrite® kaolin products from Imerys. As known in the art, wetting agents, dispersing agents, defoamers, and the like (more broadly classified as surfactants) may be added to improve the dispersion of the pigments and the spreading properties of the coating. Exemplary suppliers of surfactants include Dow (Michigan), Dystar (Singapore), and BASF (Germany). In one aspect of the invention, pigments having a plate-like morphology may be desired. Mixtures of any of the aforementioned pigments may be suitable for use in the present invention.

In one aspect of the invention, at least one adhesive material is applied to the floorcovering article during the manufacturing process. In this embodiment, the floorcovering articles are ready to be installed on the chemically-abated flooring surface that further contains a barrier material. After installation, at least a portion of the adhesive material is in direct physical contact with at least a portion of the barrier material.

In another aspect of the invention, at least one adhesive material is applied to the chemically-abated flooring surface that further contains a barrier material (i.e. not applied to floorcovering article during the manufacturing process).

It is also further contemplated to be within the scope of this invention that the at least one adhesive material is applied both to the floorcovering article during the manufacturing process and to the chemically-abated flooring surface separately from the manufacturing process. Alternatively, in another aspect of the invention, no adhesive material is applied to the chemically-abated flooring surface.

Adhesive materials are selected from the group consisting of hot melt adhesives (such as polyurethane hotmelt, polyolefin hotmelt, and the like), pressure sensitive adhesives, polyvinyl chloride ("pvc"), acrylic/pvc copolymer, partially chlorinated acrylic polymer, bitumen materials, and the like, and combinations thereof. Pressure sensitive adhesives include emulsions, solutions (also called solvent adhesives), hot melts adhesives, ultraviolet light-cured adhesives, and solids (referring to the amount of non-solvent content in an adhesive by weight). Pressure sensitive adhesives may be selected from rubber-based adhesives, acrylic-based adhesives, modified acrylic adhesives, silicone adhesives, and combinations thereof.

Pressure-sensitive adhesives (or "PSAs") are generally classified into two main classes: 100% solids and less than 100% solids. A 100% solids refers to the amount of non-solvent content in an adhesive by weight. These adhesive materials are further characterized as being polymeric adhesive materials. In the class of 100% solids, adhesive materials may be further characterized as plastisol, thermoplastic, or thermoset. Thermoplastic adhesives are also known as hot-melt adhesives. In the class of less than 100% solids, adhesive materials may be further characterized as solvent borne-solution or water-borne emulsion (also referred to as water-borne latex). Within each of these further characterizations, adhesive materials may be described as being either a permanent adhesive or a removeable/repositionable adhesive. As used herein, a "permanent" adhesive is an adhesive designed to stick to a substrate (also known as the adherent) without edge lifting and that cannot be removed without damaging either the adhesive material itself or the substrate to which it has been adhered. A "removeable" adhesive is an adhesive designed to stick to a substrate without edge lifting and that can be removed without damaging either the adhesive material itself or the substrate to which it has been adhered. In addition, "permanent" or "removeable/repositionable" can be determined by how the layers of material which are adhered together with an adhesive material fracture during stress (also known as "adhesive failure mode"). For example, under stress, permanent adhesives are typically designed to fracture in the adherent itself and not in the interface of adhesive material and adherent. In contrast, repositionable adhesives are typically designed to fracture under stress in the interface of the adhesive material and the adherent. Additional information regarding adhesive materials as described herein may be found at https://label.averydennison.asia/content/dam/averydennison/lpm/na/en/doc/home/resource%20center/Adhesive%20 Overview(1).pdf, which is entirely incorporated by reference herein. Also, adhesive materials useful in the present invention are described in Pressure-Sensitive Design and Formulation, Application by Istvan Benedek (Koninklijke Brill NV, Leiden, The Netherlands, Vol. 2, 2006), which book is entirely incorporated by reference herein. Information regarding adhesives under stress (e.g. adhesive failure modes) can be found at http://www.nhml.com/adhesion-failure-modes, which is entirely incorporated by reference herein.

In one aspect of the invention, and as shown in FIG. 1, Adhesive A and Adhesive B are pressure sensitive adhesives. Adhesive A is a waterborne acrylic pressure sensitive adhesive. Adhesive B is a hotmelt pressure sensitive adhesive. Commercially available acrylic pressure sensitive adhesives are available, for example, from Bostik (US) and Royal Adhesives and Sealants (US). Commercially available hotmelt pressure sensitive adhesives are available, for example, from Bostik (US), Reynolds (US), and Adhesive Specialists Inc. (US).

Standard methods of known floorcovering installation may be used to achieve application and/or adherence of the floorcovering article to the flooring surface. For the sake of completeness and illustration, the construction of floorcovering articles is further herein described.

Floorcovering articles, that may be applied to and/or installed on the chemically-abated flooring surface of the invention described herein include, without limitation, woven carpet, knitted carpet, tufted carpet, graphics tufted carpet, stitched on pile carpet, bonded pile carpet, hooked carpet, knotted pile carpet, and the like. The floorcovering articles may be broadloom carpet or carpet tiles. The floorcovering articles may be of any suitable construction (e.g. hardback, cushion back, etc.). The face may be constructed of any appropriate textile material in yarn or pile form that is suitable for dyeing and patterning, and may have a face height or pile height that is uniform or non-uniform (e.g. may be textured, as found in a multi-level loop pile) created by tufting, needling, flocking, bonding, and the like, or the use of non-woven substrates. Patterning of the floorcovering article may be achieved by weaving, tufting, and/or printing processes.

In one aspect of the present invention, the tufted pile carpet is comprised of yarn tufted into fabric, which is then injection or fluid dyed, and then bonded with a rubber layer or latex backing. The carpet yarn may be selected from nylon 6; nylon 6,6; polyester; and polypropylene fiber. The yarn is tufted into a woven or nonwoven substrate. The yarn can be of any pile height and weight necessary to support printing. The tufted pile carpet may be printed using any print process. In one aspect, injection dyeing may be utilized to print the tufted pile carpet.

Printing inks will contain at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxsazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthal imide, naphthoquinone imide and methane, triarylmethine and quinoline types.

As is known in the textile printing art, specific dye selection depends upon the type of fiber and/or fibers comprising the floorcovering article being printed. For example, in general, a disperse dye may be used to print polyester fibers. Alternatively, for materials made from cationic dyeable polyester fiber, cationic dyes may be used.

Printing processes useful in conjunction with the present invention may employ a jet dyeing machine, or a digital printing machine, to place printing ink on the surface of the floorcovering article in predetermined locations. One suitable and commercially available digital printing machine is the Millitron® digital printing machine, available from Milliken & Company of Spartanburg, S.C. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, S.C. In one aspect, a tufted carpet made according to the processes disclosed in U.S. Pat. Nos. 7,678,159 and 7,846,214, both to Weiner, may be printed with a jet dyeing apparatus as described and exemplified herein.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, Mass. Alternatively, polymer viscosity may be measured by using a parallel plate rheometer, such as made by Haake from Rheology Services of Victoria Australia.

Figure 3:
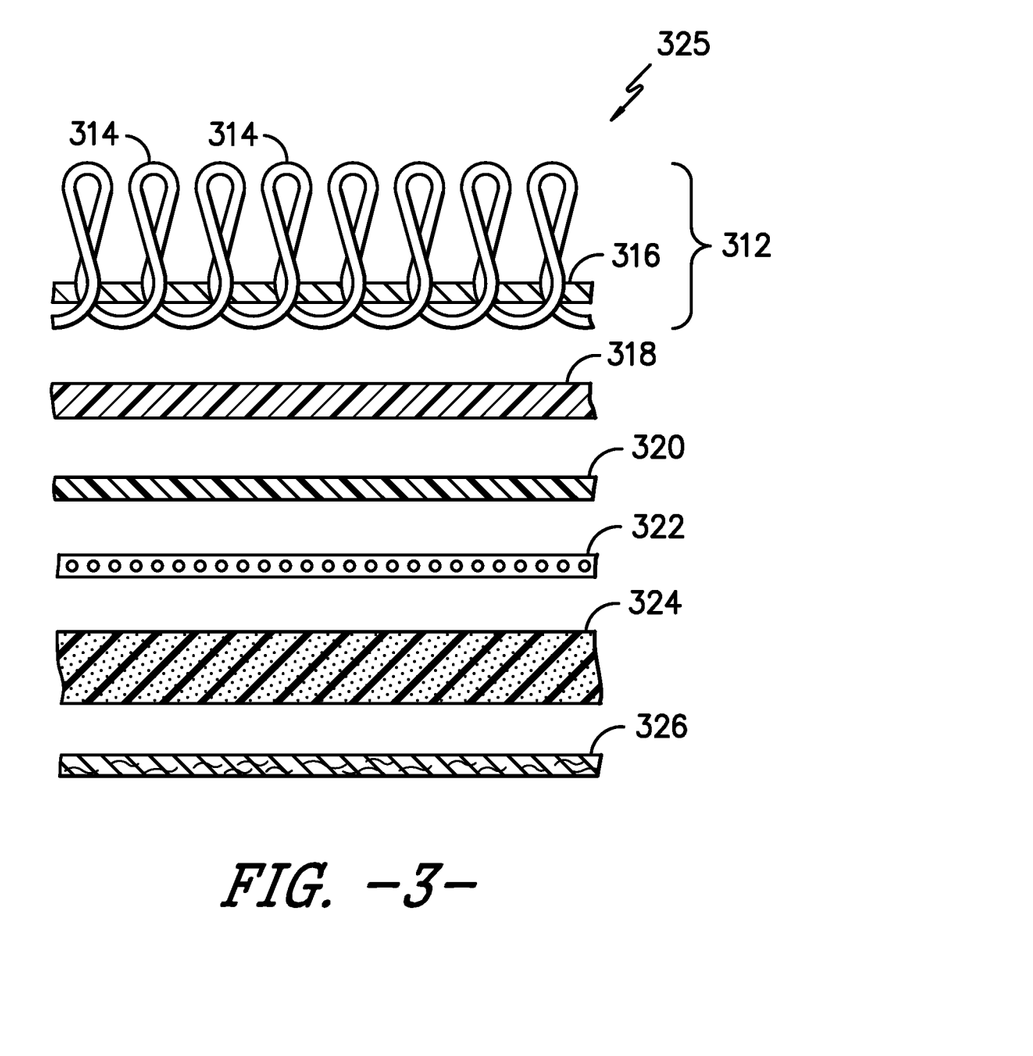
FIG. 3 is an exploded schematic view of one embodiment of a floorcovering article which may be applied to the chemically abated flooring surface according to the present invention.

One exemplary floorcovering construction is shown in FIG. 3. In this exemplary construction, floorcovering article 325 is made up of a primary carpet fabric 312 formed from a plurality of pile yarns 314 tufted through a primary backing layer 316 such as a scrim or nonwoven fibrous textile of polyester or polypropylene. A precoat backing layer 318 of a resilient adhesive such as SBR latex is disposed across the underside of primary carpet fabric 312 so as to hold the pile yarns 314 in place within the primary backing 316. An adhesive layer 320 such as a hot melt adhesive extends away from the precoat backing layer 318. A layer of stabilizing material 322 such as woven or nonwoven glass is disposed at a position between the adhesive layer 320 and a cushioning layer 324 such as virgin or rebounded polyurethane foam or the like. A secondary backing layer 326 such as a nonwoven blend of polyester and polypropylene fibers is disposed across the underside of the cushioning layer 324.

Pile yarns 314 may be either spun or filament yarns formed of natural fibers such as wool, cotton, or the like. The pile yarns 314 may also be formed of synthetic materials such as polyamide polymers including nylon 6 or nylon 6,6; polyesters such as PET and PBT; polyolefins such as polyethylene and polypropylene; rayon; and polyvinyl polymers such as polyacrylonitrile. Blends of natural and synthetic fibers such as blends of cotton, wool, polyester and nylon may also be used within the pile yarns 314. In FIG. 3, the pile yarns 314 are illustrated in a loop pile construction. Of course, it is to be understood that other pile constructions as will be known to those of skill in the art including cut pile constructions and the like may likewise be used.

Floorcovering articles may have a fiber face weight in the range from about 1 to about 75 ounces/square yard, or in the range from about 5 to about 60 ounces/square yard, or in the range from about 10 to about 55 ounces/square yard, or in the range from about 20 to about 50 ounces/square yard.

In addition, the textile materials and/or fabrics comprising the floorcovering article, for example, the pile surface of a floorcovering article, may be synthetic fiber, natural fiber, man-made fiber using natural constituents, inorganic fiber, glass fiber, or a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof.

The textile substrates of the floorcovering article may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the textile substrates will generally be comprised of interlaced fibers, interlaced yarns, loops, or combinations thereof.

The textile substrates may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Furthermore, the textile substrates may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, the fibers comprising the textile substrates may include additives coextruded therein, may be precoated with any number of different materials, including those listed in greater detail below, and/or may be dyed or colored to provide other aesthetic features for the end user with any type of colorant, such as, for example, poly(oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

As will be appreciated, the actual construction of floorcovering article 325 may be subject to a wide range of variations. Accordingly, the multi-layered construction illustrated in FIG. 3 is to be understood as constituting merely an exemplary construction representative of a floorcovering article and that the present invention is equally applicable to any other construction of carpeting and/or other textiles as may be desired. By way of example only, various suitable carpet tile constructions are described in U.S. Pat. Nos. 6,203,881 and 6,468,623.

Figure 4:
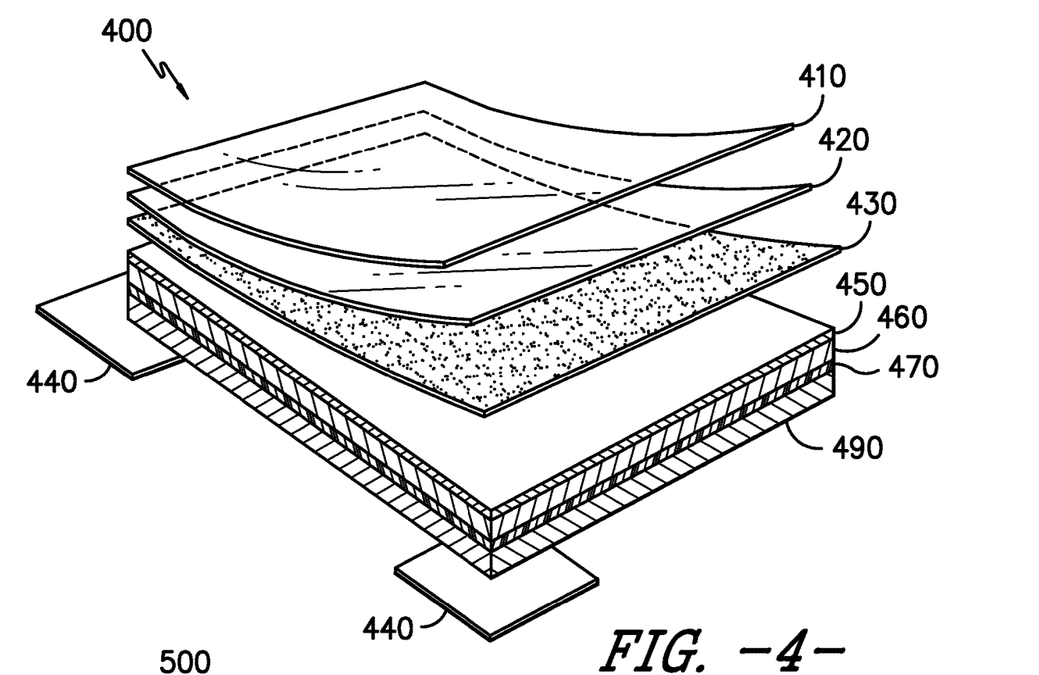
FIG. 4 is an expanded side view of one embodiment of a vinyl-containing floor tile with individual adhesive units as fasteners.

Other floorcovering articles may include vinyl tile, such as luxury vinyl tile. FIGS. 4 to 7 illustrate various vinyl tile constructions which may be utilized with the process of the present invention. FIGS. 4 to 7 are representative examples of multi-layered vinyl floor tile also known as a luxury vinyl tile (or "LVT"). FIG. 4 illustrates vinyl tile 400 comprised of seven sequential layers that include polyurethane coating 410, transparent wear layer 420, printed layer 430, vinyl core layer 450, vinyl backing layer 460, adhesive layer 470, and textile substrate layer 490. In one aspect of the invention, transparent wear layer 420 may be comprised of a vinyl-containing material. Adhesive layer 470 may also be comprised of a vinyl-containing adhesive material. In another aspect of the invention, textile substrate layer 490 is a nonwoven textile substrate and is comprised of polyester fiber, polypropylene fiber or blends of polyester and polypropylene fibers. An adhesive system is illustrated as adhesive fastener 440. Adhesive fastener 440 is comprised of adhesive materials as described herein. Adhesive fastener 440 is positioned and attached to vinyl tile 400. A plurality of vinyl tiles may be attached to one another via the adhesive fasteners. Additional adhesive material is utilized with the adhesive system to form a non-floating floorcovering article comprised of a plurality of vinyl tiles attached to one another via adhesive fasteners.

Figure 5:
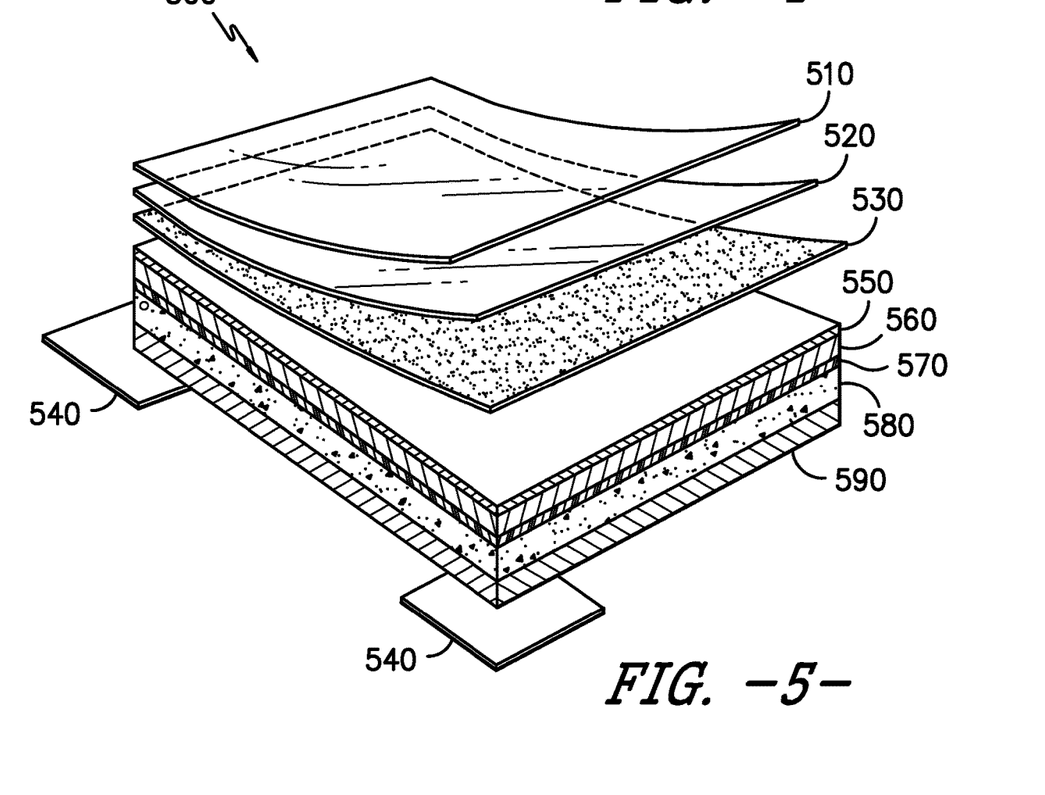
FIG. 5 is an expanded side view of another embodiment of a vinyl-containing floor tile with individual adhesive units as fasteners.

FIG. 5 illustrates vinyl tile 500 comprised of eight sequential layers that include polyurethane coating 510, transparent wear layer 520, printed layer 530, vinyl core layer 550, vinyl backing layer 560, adhesive layer 570, foam layer 580, and textile substrate layer 590. In one aspect of the invention, transparent wear layer 520 may be comprised of a vinyl-containing material. Adhesive layer 570 may also be comprised of a vinyl-containing adhesive material. Foam layer 580 is an open cell or closed cell foam material. Foam layer 580 may be a polyurethane foam, a foamed vinyl material, or a foamed layer comprised of other suitable polymer materials known for use as foam articles. In another aspect of the invention, textile substrate layer 590 is a nonwoven textile substrate and is comprised of polyester fiber, polypropylene fiber or blends of polyester and polypropylene fibers. An adhesive system is illustrated as adhesive fastener 540. Adhesive fastener 540 is comprised of adhesive materials as described herein. Adhesive fastener 540 is positioned and attached to vinyl tile 500.

Figure 6:
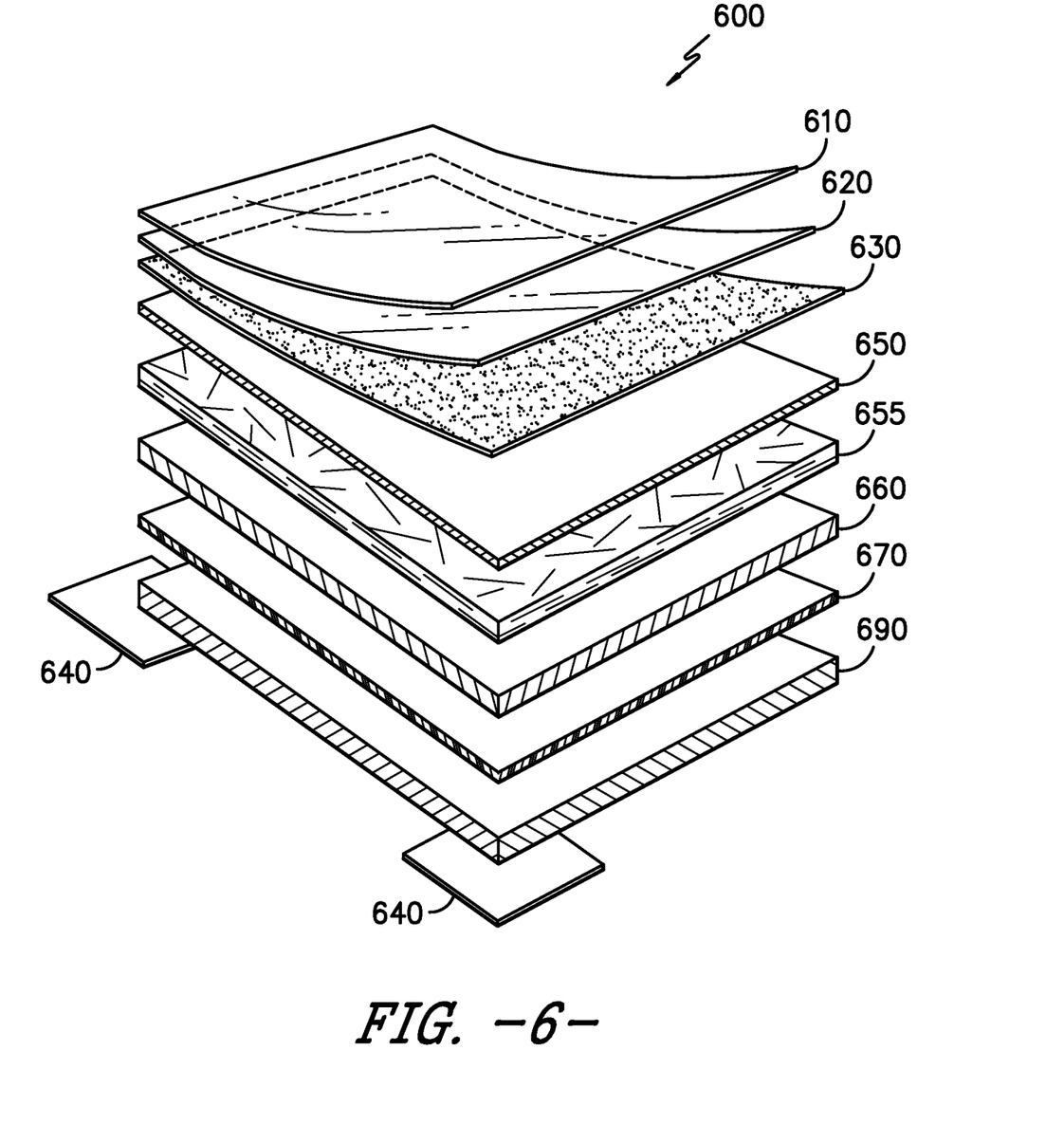
FIG. 6 is an expanded side view of yet a further embodiment of a vinyl-containing floor tile with individual adhesive units as fasteners.

FIG. 6 illustrates vinyl tile 600 comprised of eight sequential layers that include polyurethane coating 610, transparent wear layer 620, printed layer 630, vinyl core layer 650, glass fiber layer 655, vinyl backing layer 660, adhesive layer 670, and textile substrate layer 690. In one aspect of the invention, transparent wear layer 620 may be comprised of a vinyl-containing material. Adhesive layer 670 may also be comprised of a vinyl-containing adhesive material. In another aspect of the invention, textile substrate layer 690 is a nonwoven textile substrate and is comprised of polyester fiber, polypropylene fiber or blends of polyester and polypropylene fibers. An adhesive system is illustrated as adhesive fastener 640. Adhesive fastener 640 is comprised of adhesive materials as described herein. Adhesive fastener 640 is positioned and attached to vinyl tile 600.

Figure 7:
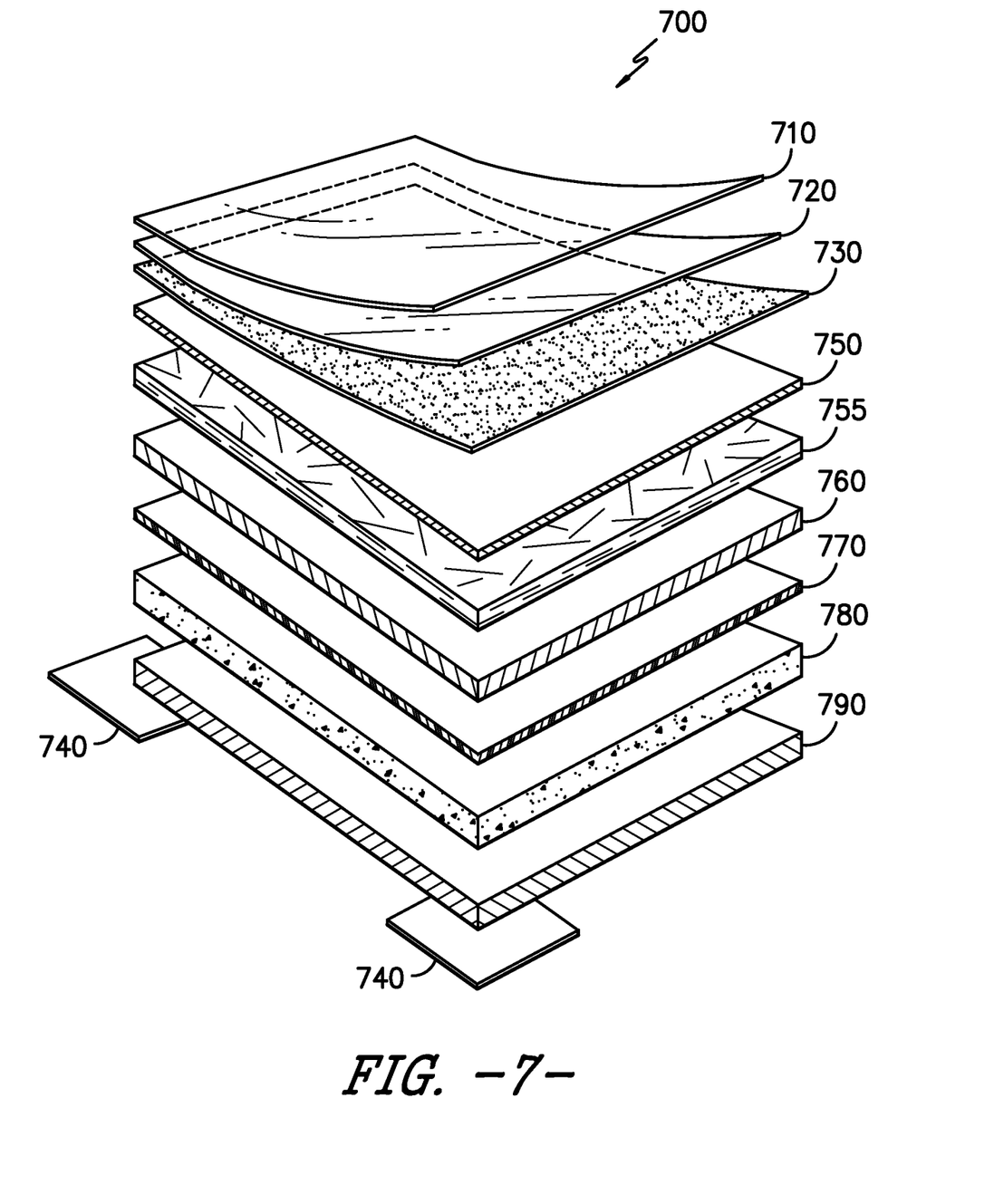
FIG. 7 is an expanded side view of another embodiment of a vinyl-containing floor tile with individual adhesive units as fasteners.

FIG. 7 illustrates vinyl tile 700 comprised of nine sequential layers that include polyurethane coating 710, transparent wear layer 720, printed layer 730, vinyl core layer 750, glass fiber layer 755, vinyl backing layer 760, adhesive layer 770, foam layer 780, and textile substrate layer 790. In one aspect of the invention, transparent wear layer 720 may be comprised of a vinyl-containing material. Adhesive layer 770 may also be comprised of a vinyl-containing adhesive material. Foam layer 780 is an open cell or closed cell foam material. Foam layer 780 may be a polyurethane foam, a foamed vinyl material, or a foamed layer comprised of other suitable polymer materials known for use as foam articles. In another aspect of the invention, textile substrate layer 790 is a nonwoven textile substrate and is comprised of polyester fiber, polypropylene fiber or blends of polyester and polypropylene fibers. An adhesive system is illustrated as adhesive fastener 740. Adhesive fastener 740 is comprised of adhesive materials as described herein. Adhesive fastener 740 is positioned and attached to vinyl tile 700.

It should be noted that the layers of the vinyl article described herein (e.g. as described in FIGS. 4 to 7) are typically prepared and combined together in larger roll form, and not initially in smaller tile form. Thus, after assembling the layers of the vinyl article together, the article is then cut into vinyl tiles. The vinyl article may be cut using a computer controlled cutting device, such as a Gerber machine, or by using a mechanical dye cutter. The vinyl article should be cut with precision such that the resulting cut tiles fit in place with the surrounding cut tiles. The vinyl article may be cut into vinyl tiles having sizes in the range from 4 inches by 4 inches to 72 inches by 72 inches. The vinyl tiles may be of the same length and width, thus forming a square shape. Or, the vinyl tiles may have different dimensions such that the width and the length are not the same. For example, the vinyl tiles may be a rectangular shape.

It should be understood that the construction of the vinyl tile described herein is not limited only to that which is shown by the Figures. Additional layers of substrate may be included in the vinyl tile. For example, a removeable and/or/repositionable adhesive may be included on the floor facing surface of the vinyl tile. Alternatively, one or more layers of substrate may be removed from the vinyl tile and still be within the scope of the present invention.

The following examples further illustrate the subject matter of the present invention but should not be construed as in any way limiting the scope thereof.

The chemical abatement process of the invention was conducted and tested as described herein below. The flooring surface was concrete having mastic material thereon. The floorcovering article applied to the chemically abated flooring surface was carpet tile. The carpet tile was commercially available Underscore—Formwork carpet tile and Underscore—Tractionback Plus—Formwork carpet tile, both available from Milliken & Company of Spartanburg, S.C. The size of each carpet tile was 50 cm by 50 cm.

The following process for chemical abatement of the flooring surface according to this invention was used:
1. Abatement chemical was poured onto the concrete flooring surface and spread across the flooring surface with a plastic short bristle brush.
2. The abatement chemical was allowed to soak and penetrate into the mastic material for 15-25 minutes.
3. A floor scraper was used to rub and scrape the concrete surface. Loosened mastic material was moved and into a pile and removed with a plastic shovel.
4. The flooring surface was scrubbed with a short bristle brush.
5. As needed, additional abatement chemical was added to the flooring surface.
6. The abatement chemical was allowed to soak for 1 to 2 hours.
7. "Oil-Dri" dry absorbent was spread on the flooring surface at a rate of 40 #/100-150 ft$^2$ until all of the visible abatement chemical was removed.
8. The dry absorbent was collected into plastic drums for proper waste disposal.
9. The flooring surface was cleaned with detergent and water per product instructions.
10. The liquid on the flooring surface was then squeegeed and removed with a wet vacuum and/or mop.
11. Using clean water and a mop, the flooring surface was mopped several times, with frequent water changes.
12. The flooring surface was allowed to dry for 3 days.
13. A barrier chemical was applied to the chemically abated flooring surface using a ⅜" nap paint roller. The paint roller was rolled in both horizontal and vertical directions in order to thoroughly and uniformly coat the flooring surface with the barrier chemical.
14. The chemically abated flooring surface containing a barrier coating was allowed to air dry.
15. Carpet tile was then applied to the flooring surface using the appropriate installation techniques for each respective carpet.

The following materials were used in the process of the invention:

Abatement Chemicals:

Three abatement chemicals were tested according to the process of the invention. Sentinel Low Odor Mast Remover SC-170 (referred to as "Petroleum" in Tables) was a petroleum-based chemical available from Jon-Don Atlanta of Norcross, Ga. Mast-Away 77 (referred to as "Citrus" in Tables) was a natural-based citrus chemical available from Mast-Away Mastic Removers of St. Louis, Mo. Blue Bear® 500 MR (referred to as "Soy" in Tables) was an alkyl ester soybean oil-based chemical available from Jon-Don Atlanta of Norcross, Ga.

Cleaning Materials:

Two cleaning materials were tested according to the process of the invention. CoverClean HC (referred to as "Bio Soap" in Tables) was a microbial cleaner available from CoverTec Products of Sunrise, Fla. Phlex Cleaner/Degreaser (also referred to as "Standard Soap" in Tables) was a solvent-free cleaner and degreaser detergent available from Mast-Away Mastic Removers of St. Louis, Mo.

Barrier Materials:

Several barrier materials were tested according the process of the invention. Star® SOS Sealer™ (referred to as "SOS" in Tables) was a latex-based coating available from Hercules Sealcoat Mfg., Inc. Star® SOS Sealer™ was also diluted with water to create a mixture that was 50% by weight of the SOS material (referred to as "50% SOS" in Tables). Latex-Ite® Oil Spot Primer (referred to as "Latex-Ite" in Tables) was a synthetic resin liquid material available from Dalton Enterprises, Inc. of Cheshire, Conn. In several embodiments of testing, no barrier material was used (indicated as "None" in Tables).

Adhesive Materials:

Two adhesive materials were tested according the process of the invention.

Adhesive A was Milliken Non-Reactive Standard Modular Carpet Adhesive, an acrylic emulsion adhesive available from Milliken & Company of Spartanburg, S.C. It was applied to the cleaned floor using a ¾" nap roller and air dried as specified in the product's published installation instructions.

Adhesive B was TractionBack® Plus backing system also from Milliken & Company. A hotmelt-based, high friction, pressure sensitive adhesive was applied to the carpet tile during the manufacturing process. The carpet tiles were further bound together using 4 inch square adhesive strips containing 3 mils of acrylic pressure sensitive adhesive.

Table 1 provides information regarding the various embodiments tested according to the process of the invention. Sample Nos. 1, 2, 5, 7, 8, 11, 13, 14, 17 and 19-27 are considered to be Inventive Examples. Sample Nos. 3, 4, 6, 9, 10, 12, 15, 16 and 18 are considered to be Comparative Examples.

TABLE 1

Chemical Abatement of Flooring Surface

| Sample No. | Abatement Chemical | Detergent Material | Barrier Material | Adhesive Material |
|---|---|---|---|---|
| 1 | Petroleum | BioSoap | Latex-Ite | B |
| 2 | Petroleum | BioSoap | SOS | B |
| 3 | Petroleum | BioSoap | None | A |
| 4 | Petroleum | BioSoap | None | B |
| 5 | Petroleum | Standard Soap | SOS | A |
| 6 | Petroleum | Standard Soap | None | A |
| 7 | Citrus | Bio Soap | Latex-Ite | B |
| 8 | Citrus | Bio Soap | SOS | B |
| 9 | Citrus | Bio Soap | None | A |
| 10 | Citrus | Bio Soap | None | B |
| 11 | Citrus | Standard Soap | SOS | A |
| 12 | Citrus | Standard Soap | None | A |
| 13 | Soy | Bio Soap | Latex-Ite | B |
| 14 | Soy | Bio Soap | SOS | B |
| 15 | Soy | Bio Soap | None | A |
| 16 | Soy | Bio Soap | None | B |
| 17 | Soy | Standard Soap | SOS | A |
| 18 | Soy | Standard Soap | None | A |
| 19 | Petroleum | Bio Soap | SOS | A |
| 20 | Petroleum | Bio Soap | 50% SOS | A |
| 21 | Petroleum | Bio Soap | Latex-Ite | A |
| 22 | Citrus | Bio Soap | SOS | A |
| 23 | Citrus | Bio Soap | 50% SOS | A |
| 24 | Citrus | Bio Soap | Latex-Ite | A |
| 25 | Soy | Bio Soap | SOS | A |
| 26 | Soy | Bio Soap | 50% SOS | A |
| 27 | Soy | Bio Soap | Latex-Ite | A |

Upon visual inspection, it was noted that the chemically abated flooring surfaces exhibited altered depths of color. More specifically, the use of citrus oil and soybean oil abatement chemicals provided chemically abated flooring surfaces having a darker depth of color than petroleum-based abatement chemicals. Also, the barrier-coated flooring surfaces exhibited a light-reflecting sheen.

Evaluation of Adhesion of Floorcovering Article to Chemically Abated Flooring Surface with Barrier Coating:

Carpet tile samples containing Adhesive A were tested for 24-hour bonding to the flooring surface. The test method was as follows:

The adhesive was applied to the cleaned concrete for a releasable installation using a ¾" roller at approximately a 35 to 40 sq. yds./gallon application rate. The adhesive was allowed to dry completely prior to installation of the modular carpet. The properly dried adhesive did not transfer to the finger and had a tacky feel. After placing the carpet tile on the dried adhesive, downward pressure was applied to assure contact with the substrate. After 24 hours, a carpet tile from the installation was pulled up to see if the modular carpet was adequately bonded to the concrete substrate, inhibiting any lateral movement, and confirming that the adhesive remained firmly bonded to the concrete substrate. For properly adhered adhesive, all the adhesive should remain on the floor, and no adhesive should transfer to the back of the tile.

A "pass" rating means that (a) no delamination of the layers of the carpet tile was visually observed and (b) no movement of carpet tile, gapping between carpet tiles or curling of the carpet tile edge(s) was visually observed. A "fail" rating means at least one of the following was visually observed: some amount of delamination of the layers of the carpet tile, movement of the carpet tile, gapping between carpet tiles, and curling of edge(s) of carpet tile.

The test results are provided in Table 2.

TABLE 2

Adhesive A Test Results for 24-Hour Bonding

| Sample No. | Abatement Chemical | Detergent Material | Barrier Chemical | Adhesive Material | Test Result |
|---|---|---|---|---|---|
| 19 | Petroleum | Bio Soap | SOS | A | Fail* |
| 20 | Petroleum | Bio Soap | 50% SOS | A | Pass |
| 21 | Petroleum | Bio Soap | Latex-Ite | A | Pass |
| 3 | Petroleum | Bio Soap | None | A | Pass |
| 22 | Citrus-Based | Bio Soap | SOS | A | Pass |
| 23 | Citrus-Based | Bio Soap | 50% SOS | A | Pass |
| 24 | Citrus-Based | Bio Soap | Latex-Ite | A | Pass |
| 9 | Citrus-Based | Bio Soap | None | A | Pass |
| 25 | Soy-Based | Bio Soap | SOS | A | Pass |
| 26 | Soy-Based | Bio Soap | 50% SOS | A | Pass |
| 27 | Soy-Based | Bio Soap | Latex-Ite | A | Pass |
| 15 | Soy-Based | Bio Soap | None | A | Pass |

*Two carpet tiles independently produced a quarter-sized (24-25 mm; 0.5-1.0 inch) delamination area.

Evaluation of Migration of Abatement Chemicals:

The samples were analyzed by headspace solid-phase microextraction gas chromatography-mass spectrometry-flame ionization detection (SPME-GC-MS-FID) to estimate the rate that the abatement chemical migrated from the concrete and into the carpet. The samples were measured twice over a 40-day period. Periodically, small pieces of the carpet were cut from the center of modular tile, weighed, and placed into vials and sealed for analysis. Samples were equilibrated at 50° C. for 10 minutes prior to sampling with an analysis fiber. Samples containing the soybean oil-based chemical and the petroleum-based chemical were sampled for 1 minute. Samples containing the citrus-based treatment were sampled for 6 seconds. The fiber was subsequently desorbed to the GC system. For the petroleum-based chemical, dodecane and tridecane were tracked. For the soybean oil-based chemical, hexanal was tracked. Since hexanal is expected to be significantly more volatile than other soy derivatives, the results might overestimate the amount of this substance present in the carpet. For the citrus-based chemical, d-limonene was tracked. The species were identified by mass spectrometry with a FID detector. The FID peak areas were used due to the larger linear dynamic range of this detector and because no significant interferences were noted that necessitated the use of the mass spectrometer to enhance resolution. Toluene standards were injected along with the sequence to reduce error in measurements due to the significant length of instrument time. The normalized peak area for the species of interest was calculated by dividing the peak area of the sample peak by the peak area of the toluene standard. The response was then adjusted to a per weight basis by dividing the normalized peak area by the mass of the sample in the vial. The peak area was directly proportional to the concentration of abatement chemical in the sample.

Figure 8:
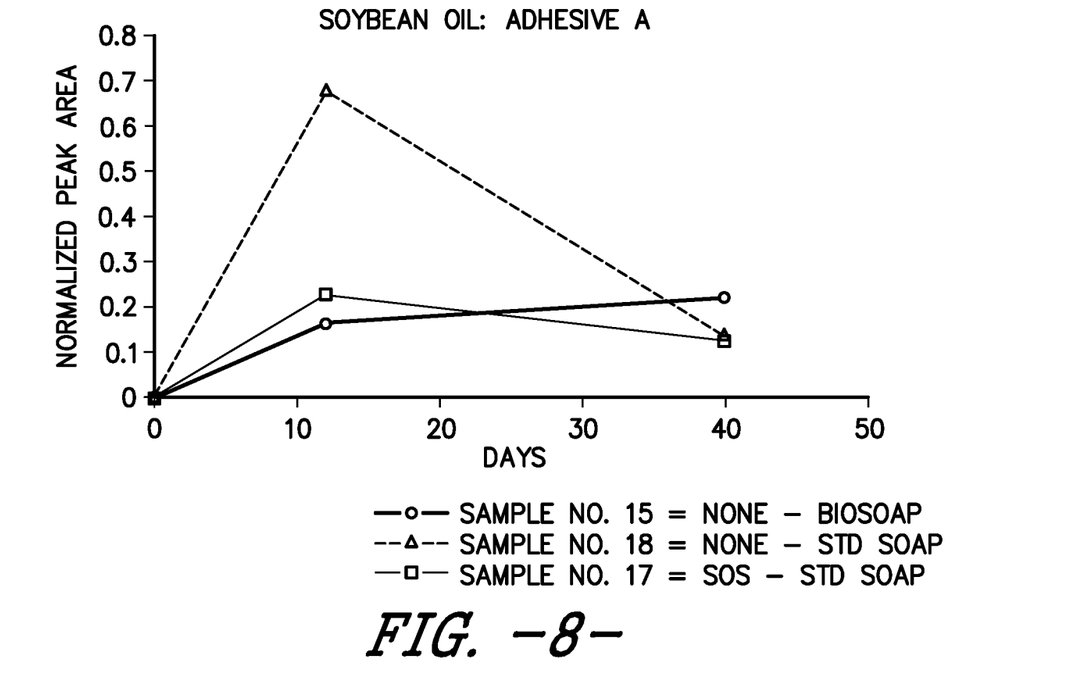
FIG. 8 is a line graph illustrating the amount of abatement chemical that migrated from the concrete flooring surface to the floorcovering article for Examples 15, 17 and 18.
Figure 9:
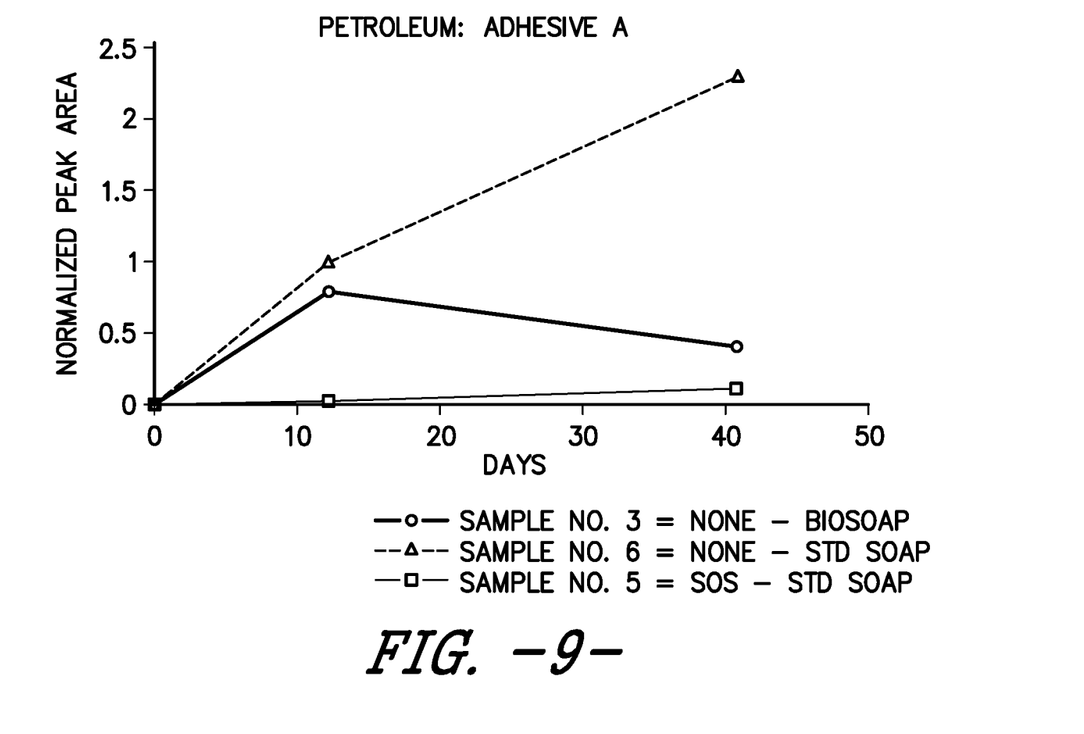
FIG. 9 is a line graph illustrating the amount of abatement chemical that migrated from the concrete flooring surface to the floorcovering article for Examples 3, 5 and 6.
Figure 10:
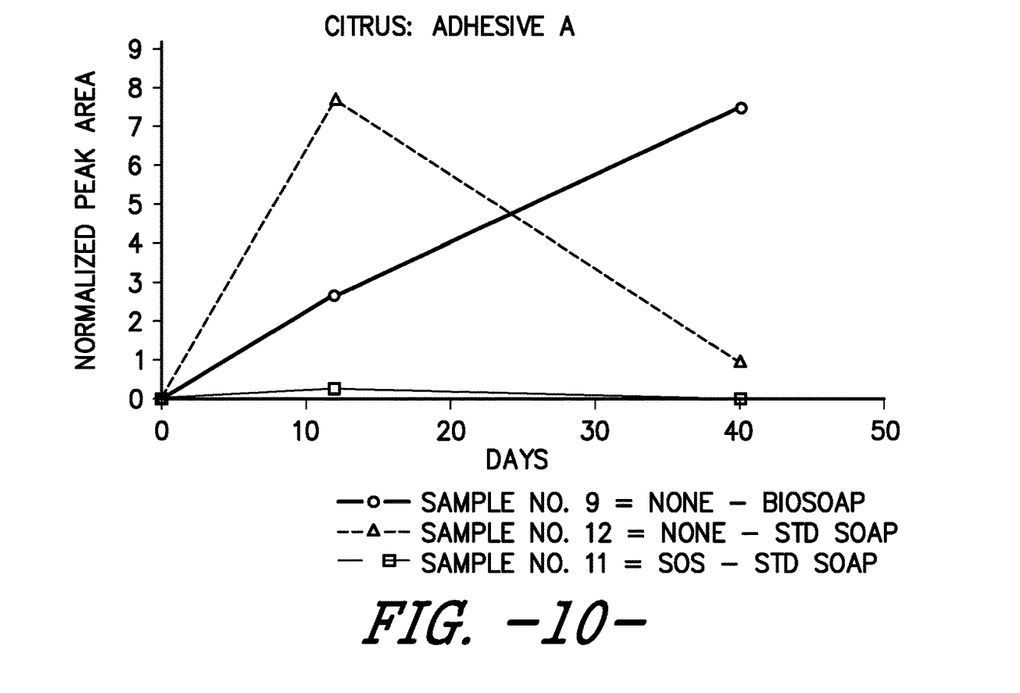
FIG. 10 is a line graph illustrating the amount of abatement chemical that migrated from the concrete flooring surface to the floorcovering article for Examples 9, 11 and 12.
Figure 11:
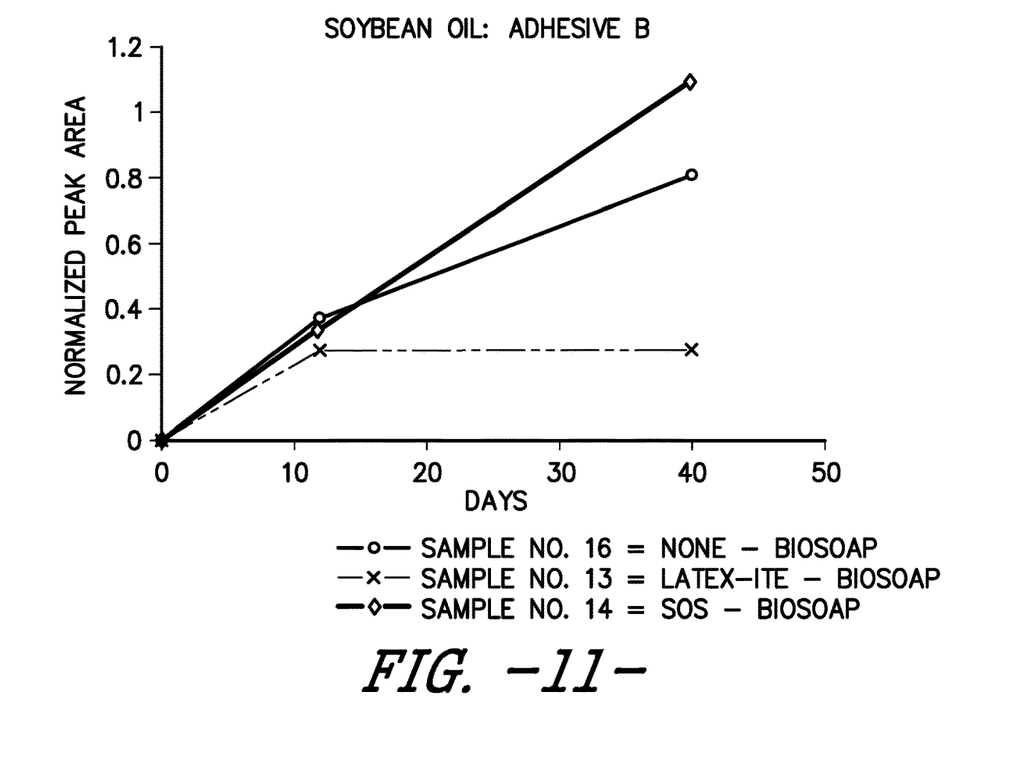
FIG. 11 is a line graph illustrating the amount of abatement chemical that migrated from the concrete flooring surface to the floorcovering article for Examples 13, 14 and 16.

Gas chromatography test results are shown in FIGS. 8 to 13. FIG. 8 is a line graph illustrating the results for soybean oil-based abatement chemicals and Adhesive A for Examples 15, 17 and 18. FIG. 9 is a line graph illustrating the results for petroleum-based abatement chemicals and Adhesive A for Examples 3, 5 and 6. FIG. 10 is a line graph illustrating the results for citrus-based abatement chemicals and Adhesive A for Examples 9, 11 and 12. FIG. 11 is a line graph illustrating the results for soybean oil-based abatement chemicals and Adhesive B for Examples 13, 14 and 16.

Figure 12:
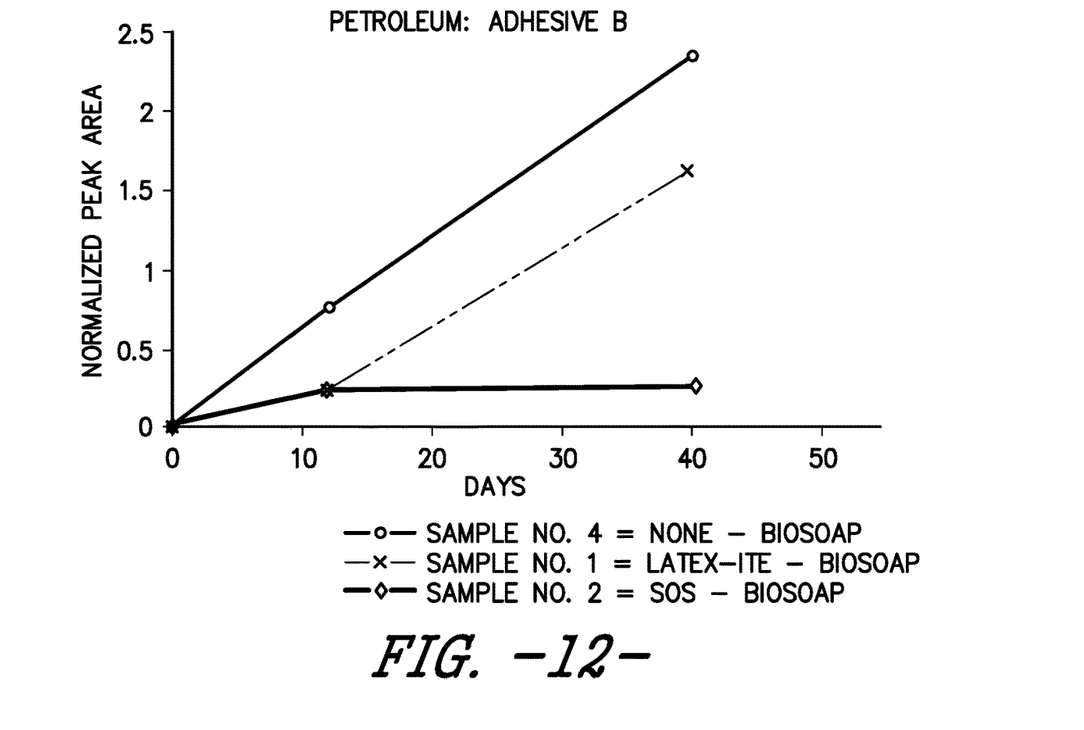
FIG. 12 is a line graph illustrating the amount of abatement chemical that migrated from the concrete flooring surface to the floorcovering article for Examples 1, 2 and 4.
Figure 13:
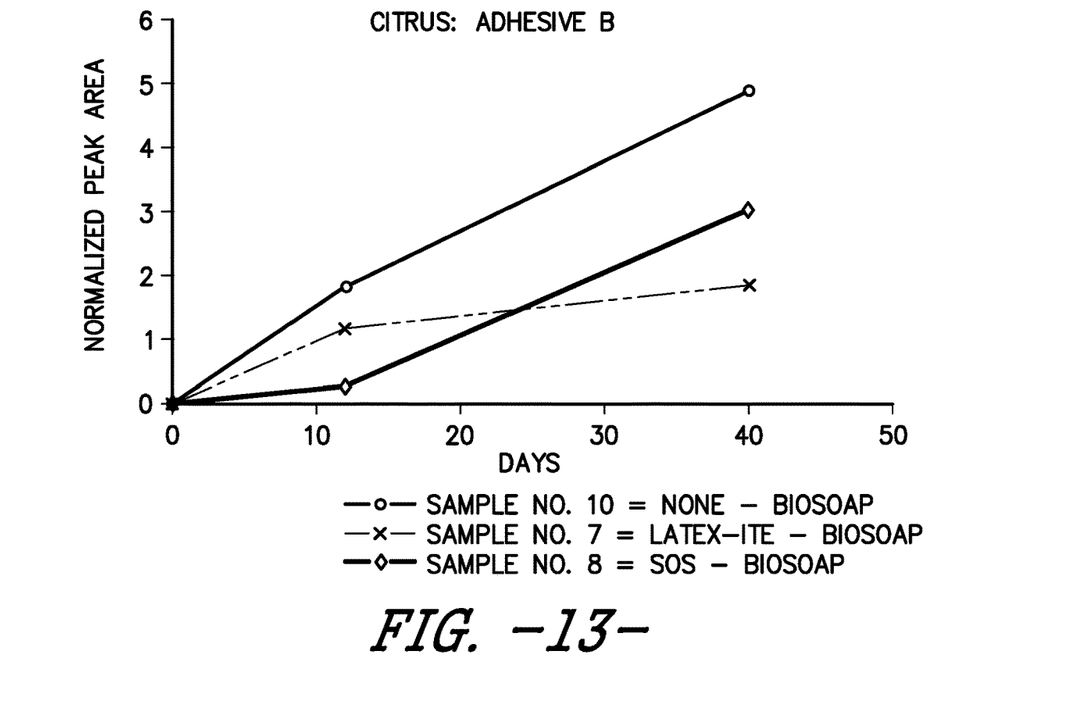
FIG. 13 is a line graph illustrating the amount of abatement chemical that migrated from the concrete flooring surface to the floorcovering article for Examples 7, 8 and 10.

FIG. 12 is a line graph illustrating the results for petroleum-based abatement chemicals and Adhesive B for Examples 1, 2 and 4. FIG. 13 is a line graph illustrating the results for citrus-based abatement chemicals and Adhesive B for Examples 7, 8 and 10.

As shown in FIGS. 8 to 13, the SPME-GC-MS-FID results indicate that the barrier coating decreases the rate at which the abatement chemical moves from the concrete into the carpet tile. In general, bio-soap aids in lowering the amount of chemical available to transfer into the carpet tile.

Pigment Evaluation:

In further testing, a mixture of 100 g of Latex-Ite® Oil Spot Primer (Dalton Enterprises, Inc., Connecticut), 8.9 g of Hydrite SB100 (Imerys, Georgia), 0.6 g of Tamol 731A (Dow, Michigan), 0.2 g of Triton N-57 (Dow, Michigan), 0.17 g of Imperon Red K-GC (Dystar, North Carolina), and 0.11 g of Masil SF19 (Dystar, North Carolina) was made and coated onto the concrete flooring surface previously abated with Sentinel Low Odor Mast Remover SC-170, Mast-Away 77, and Blue Bear® 500 MR. After air drying for about 5 minutes, a uniform red-colored coating was created. In this instance, the barrier-coated flooring surface did not exhibit a light-reflecting sheen.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A process for decreasing the rate at which abatement chemical migrates from concrete and into a floorcovering article comprising the following steps:
    (a) Providing a flooring surface having a mastic material thereon;
    (b) Applying at least one natural-based abatement chemical to the mastic material on the flooring surface;
    (c) Agitating the at least one abatement chemical into and/or onto the mastic material of the flooring surface to form a chemically treated pre-abatement flooring surface;
    (d) Allowing the chemically treated pre-abatement flooring surface to rest/soak for a period of time;
    (e) Removing at least a portion of the chemically treated pre-abatement flooring surface to form a chemically abated flooring surface;
    (f) Applying a polymer-containing barrier material to at least a portion of the chemically abated flooring surface to form a chemically abated flooring surface containing a barrier coating thereon, wherein the polymer-containing barrier material comprises a mixture of:
        (i) an acrylic material,
        (ii) a first kaolin-based pigment having a plate-like morphology, and
        (iii) a second pigment that differs from the first pigment;
    (g) Applying a floorcovering article to the chemically abated flooring surface, wherein the floorcovering article contains at least one adhesive material, wherein the at least one adhesive material is in physical contact with the barrier coating of the chemically abated flooring surface and is comprised of an acrylic emulsion; and
    (h) Analyzing the floorcovering article using headspace solid-phase microextraction gas chromatography-mass spectrometry-flame ionization detection (SPME-GC-MS-FID) to measure the decreased rate that the abatement chemical migrated from the concrete into the floorcovering article.

2. The process of claim 1, wherein the second pigment is an organic pigment.

3. The process of claim 1, wherein the second pigment differs in color from the first kaolin-based pigment.

* * * * *